United States Patent [19]

Nagakura

[11] Patent Number: 4,693,218
[45] Date of Patent: Sep. 15, 1987

[54] INTERNAL COMBUSTION ENGINE

[75] Inventor: Katsuhiko Nagakura, Yawata, Japan

[73] Assignee: Yanmar Diesel Engine Co., Ltd., Osaka, Japan

[21] Appl. No.: 773,269

[22] Filed: Sep. 6, 1985

[30] Foreign Application Priority Data

| Sep. 12, 1984 | [JP] | Japan | 59-189810 |
| Apr. 10, 1985 | [JP] | Japan | 60-74297 |
| Apr. 26, 1985 | [JP] | Japan | 60-88899 |

[51] Int. Cl.$^4$ ............... F02B 19/10; F02B 19/12
[52] U.S. Cl. ................... 123/260; 123/262; 123/269
[58] Field of Search ............. 123/256, 260, 261, 262, 123/269, 276, 279, 286

[56] References Cited

U.S. PATENT DOCUMENTS

| 2,305,791 | 12/1942 | Maruhn | 123/261 |
| 2,622,570 | 12/1952 | Nallinger | 123/286 X |
| 2,858,812 | 11/1958 | Hoffmann | 123/262 |
| 3,270,721 | 9/1966 | Hideg et al. | 123/279 X |
| 4,077,368 | 3/1978 | Abthoff et al. | 123/261 X |

FOREIGN PATENT DOCUMENTS

| 872883  | 4/1953  | Fed. Rep. of Germany | 123/256 |
| 2945898 | 5/1981  | Fed. Rep. of Germany | 123/260 |
| 663313  | 12/1951 | United Kingdom       | 123/286 |
| 2036866 | 7/1980  | United Kingdom       | 123/276 |
| 2064643 | 6/1981  | United Kingdom       | 123/276 |

*Primary Examiner*—Tony M. Argenbright

[57] ABSTRACT

An internal combustion engine having a main combustion chamber in a top portion of a piston, and an ignition chamber which is provided with a fuel injection valve and an ignition plug, in a cylinder head, the direction in which fuel is ejected from the fuel injection valve being set in accordance with the forward direction of a swirl, the axis of the ejected fuel being spaced from a central portion of the main combustion chamber by a distance of not more than ½ of the radius thereof, a recess in communication with the main combustion chamber being provided in the section of the top portion of the piston which is on an extension of the ignition chamber.

5 Claims, 13 Drawing Figures

INTERNAL COMBUSTION ENGINE

BACKGROUND

This invention relates to an internal combustion engine, and more particularly to a stratified charge combustion type internal combustion engine.

In a conventional stratified charge combustion type internal combustion engine having a main combustion chamber in a top portion of a piston, and an ignition chamber which is provided with a fuel injection valve and an ignition plug, in a cylinder head, a rate of deposition of a fuel on a wall surface in the main combustion chamber, which is provided in the top portion of the piston, varies depending upon the direction of the ignition chamber with respect to the interior of the main combustion chamber, i.e. the direction in which the fuel is injected. In accordance with the variations in this deposition rate, the quantity of a gaseous mixture formed in the main combustion chamber and the rate of formation thereof vary.

If the degree of mixing of this gaseous mixture is low, the high-load performance of the internal combustion engine is deteriorated.

SUMMARY

Therefore, it is an object of the present invention to promote the formation of a gaseous mixture in the main combustion chamber in a stratified charge combustion type internal combustion engine, and improve the high-load performance of such an engine.

It is another object of the present invention to attain a stable ignition.

It is still another object of the present invention to avoid mutual interference between a fuel injection valve and an ignition plug for one thing and head bolts, intake/exhaust ports and a valve actuating system for the other thing, particularly in multicylinder engines.

An internal combustion engine which is capable of achieving the first object of the present invention is an internal combustion engine having a main combustion chamber in a top portion of a piston, and an ignition chamber which is provided with a fuel injection valve and an ignition plug, in a cylinder head, characterized in that the direction in which fuel is ejected from the fuel injection valve is in accordance with the forward direction of a swirl, the axis of the ejected fuel being spaced from a virtually central portion of the main combustion chamber by a distance of not more than ½ of the radius thereof, a recess in communication with the main combustion chamber being provided in the section of the top portion of the piston which is on an extension of the ignition chamber.

The second object of the present invention can be achieved by setting the diameter of the ignition chamber larger than that of fuel spray at the outlet thereof, and providing a spark gap of the ignition plug in a position which is spaced by 4 to 10 mm from the center of the spherical end of a nozzle of the fuel injection valve toward the outlet of the ignition chamber, and 2 to 7 mm from the axis of the fuel injection valve in the radial direction of the ignition chamber.

The third object of the present invention can be achieved by providing the ignition plug so that it extends at 30° to 90° with respect to the explosion surface of a cylinder head into which the ignition chamber is opened, providing the fuel injection valve so that it is inclined toward the explosion surface with respect to the ignition chamber, and providing the fuel injection valve and ignition plug in a same plane perpendicular to the explosion surface.

The Drawings

THE PREFERRED EMBODIMENTS

Figure 1:
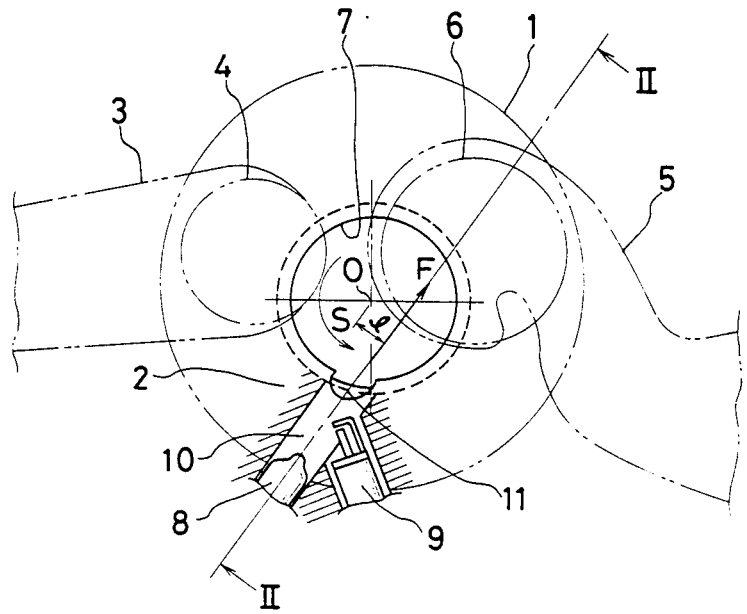
FIG. 1 is a horizontal section of a first example of a principal portion, which is around a main combustion chamber, of an internal combustion engine according to the present invention.
Figure 2:
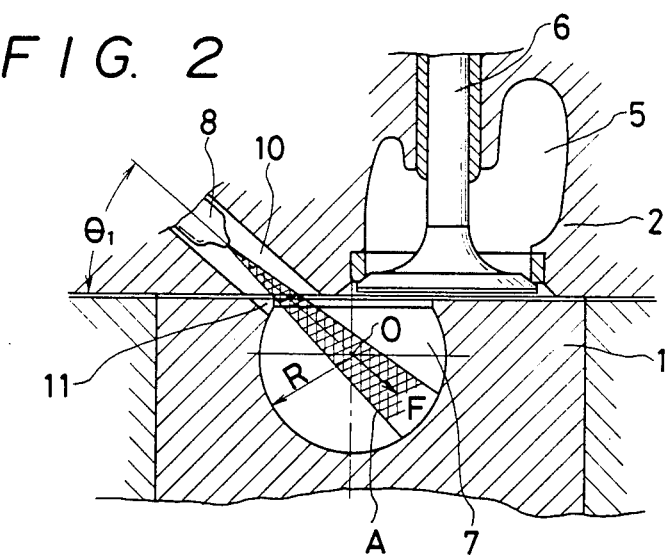
FIG. 2 is a longitudinal section taken along the line II—II in FIG. 1.

As shown in FIGS. 1 and 2, a stratified charge combustion type internal combustion engine has an exhaust valve 4 in an exhaust port 3 which is provided in a cylinder head 2, a suction valve 6 in a suction port 5, and a spherical main combustion chamber 7 in a top portion of a piston 1.

An ignition chamber 10 opposed to the main combustion chamber 7 is provided in the cylinder head 2, and a fuel injection valve 8 and an ignition plug 9 in the ignition chamber 10.

The direction F in which an atomized fuel A is ejected from the fuel injection valve 8 into the main combustion chamber 7 is set in accordance with the forward direction of a swirl S in the main combustion chamber 7 as shown in FIG. 1, and the axis of the atomized fuel spray is spaced by a distance l from the center O of the main combustion chamber 7 in the radial direction R thereof.

Setting this quantity l of displacement in the range of l=0∼½ R is very effective to promote the formation of a gaseous mixture in the main combustion chamber 7.

The direction F in which the fuel is injected may also be set contrary to the direction of the swirl S. In this case, it is preferable that the quantity l of displacement be set in the same manner as mentioned above.

The top portion of the piston 1 is provided therein with a recess 11, which is in communication with the main combustion chamber and is positioned on an extension of the ignition chamber 10. This recess 11 has a diameter equal to that of the ignition chamber 10. This enables the atomized fuel spray A to be introduced speedily from the ignition chamber 10 into the main combustion chamber 7.

As shown in FIG. 2, the angle $\theta_1$ of the ignition chamber 10 with respect to the top surface of the piston 1 is set at about 45°. This angle $\theta_1$ should be selected suitably depending upon the depth of the main combustion chamber 7.

In the internal combustion engine of the above-mentioned construction, the atomized fuel A ejected from the fuel injection valve 8 is ignited forcibly by the ignition plug 9. It is in the outer edge portion of the atomized fuel spray that a flame occurs first. However, since the direction F in which the fuel is ejected is in agreement with the direction of the swirl S with the axis of the fuel spray spaced by a predetermined distance l from the center O of the main combustion chamber 7, the mixing of the fuel with the air is done speedily, so that the flame develops speedily to the central portion of the atomized fuel spray A. This enables the high-load performance of the engine to be improved. The main combustion chamber 7 may be designed to be of a form substantially corresponding to a cylinder.

Figure 3:
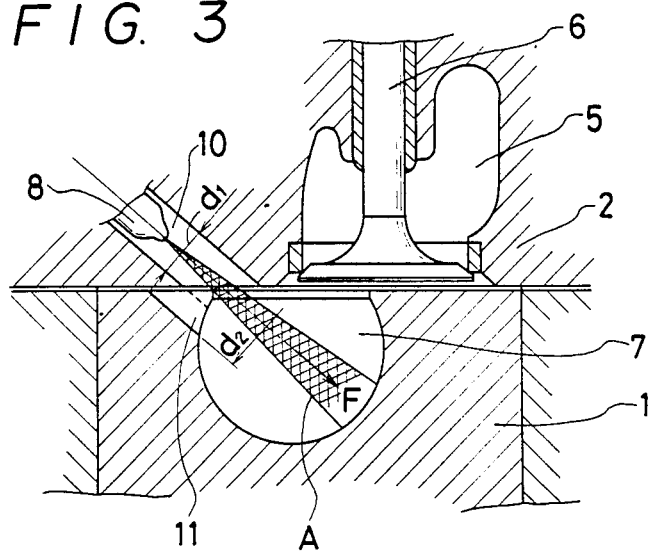
FIG. 3 is a longitudinal section of a second example of a principal portion, which is around a main combustion chamber, of an internal combustion engine according to the present invention.

When the inner diameter of the ignition chamber 10 is set to $d_1$ with the diameter of the recess 11, which is provided in the top portion of the piston 1, set to $d_2$ as shown in FIG. 3 in such a manner that $d_2$ is 1.1 to 2.5 times as large as $d_1$, the atomized fuel can be introduced more speedily into the main combustion chamber.

Figure 4:
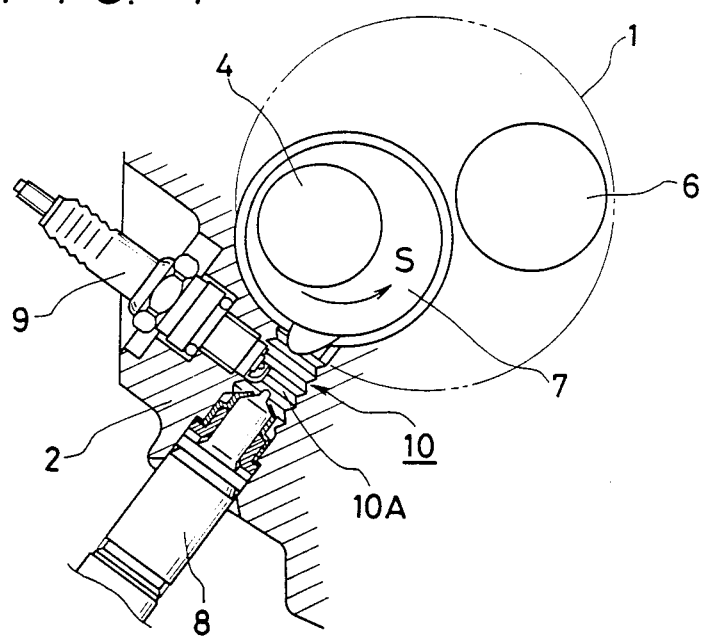
FIG. 4 is a horizontal section of a third example of a principal portion, which is around a main combustion chamber, of an internal combustion engine according to the present invention.

As shown in FIG. 4, helical, alternate grooves and ridges 10A may be provided in and on the inner surface of the ignition chamber 10. These helical, alternate grooves and ridges 10A can be formed by threading the inner surface of the ignition chamber 10.

Figure 5:
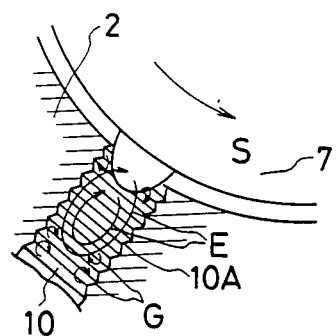
FIG. 5 is an enlarged horizontal section of a principal portion of what is shown in FIG. 4.

If a powerful swirl occurs in the main combustion chamber 7 in this embodiment, secondary eddy currents E occur as shown in FIG. 5 in the ignition chamber 10 which is in communication with the main combustion chamber 7. Owing to the secondary eddy currents E and the helical, alternate grooves and ridges 10A, smaller eddy currents G occur, so that the forcible ignition in the ignition chamber 10 is promoted.

Figure 6:
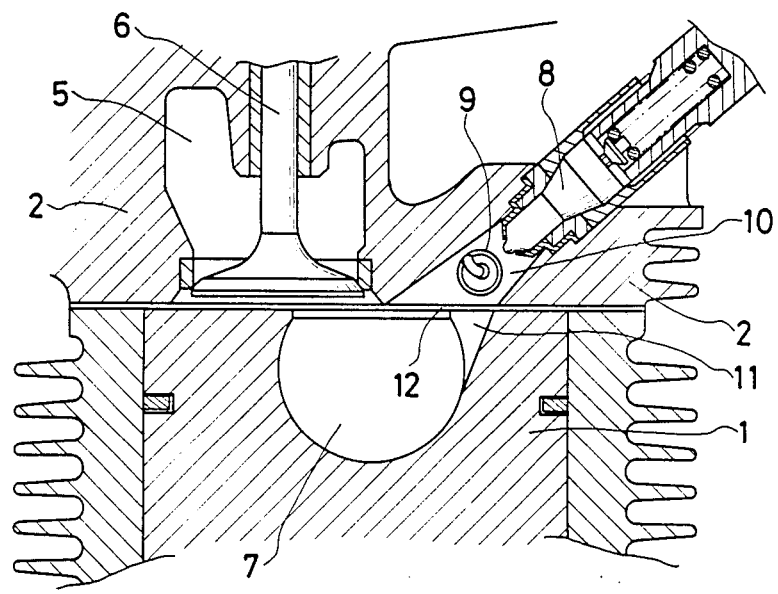
FIG. 6 is a longitudinal section of a fourth example of a principal portion, which is around a main combustion chamber, of an internal combustion engine according to the present invention.
Figure 7:
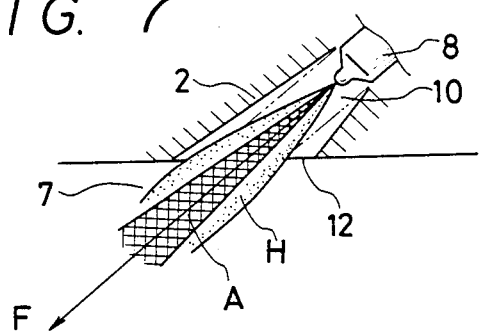
FIG. 7 is a longitudinal section of an ignition chamber shown in FIG. 6.

FIG. 6 shows an embodiment in which the diameter of the ignition chamber 10 is increased gradually toward an outlet 12 thereof. In this embodiment, a flame H expanded due to the combustion of the gaseous mixture does not contact the inner wall surface of the ignition chamber 10 as shown in FIG. 7, this allowing the combustion of the gaseous mixture to be promoted.

Figure 8:
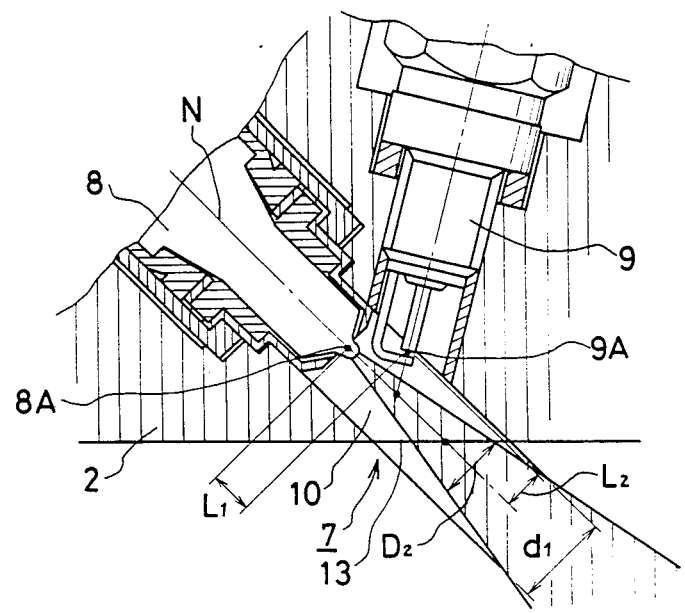
FIG. 8 is a longitudinal section of a principal portion of an ignition chamber in an internal combustion engine according to the present invention.

FIG. 8 shows a principal portion of the ignition chamber 10, in which the inner diameter $d_1$ thereof is set larger than the diameter $D_2$ of the portion of an atomized fuel spray A ejected from a fuel ejection valve 8 which is at an outlet 13 of the ignition chamber 10. Accordingly, the atomized fuel spray A does not contact the inner surface of the ignition chamber 10 in the same way as in the preceding embodiment.

In the embodiment of FIG. 6, a spark gap 9a of an ignition plug 9 is provided in a position which is spaced by a distance $L_1$ from the center of the spherical end of a nozzle of the fuel injection valve 8 toward the outlet 13 of the ignition chamber 10, and by a distance $L_2$ from the axis N of the fuel injection valve 8 in the radial direction of the ignition chamber 10. The distance $L_1$ is set to 4 to 10 mm, and preferably to 5.5 to 9.2 mm, and the distance $L_2$ to 2 to 7 mm, and preferably to 3.5 to 5.5 mm.

Figure 9:
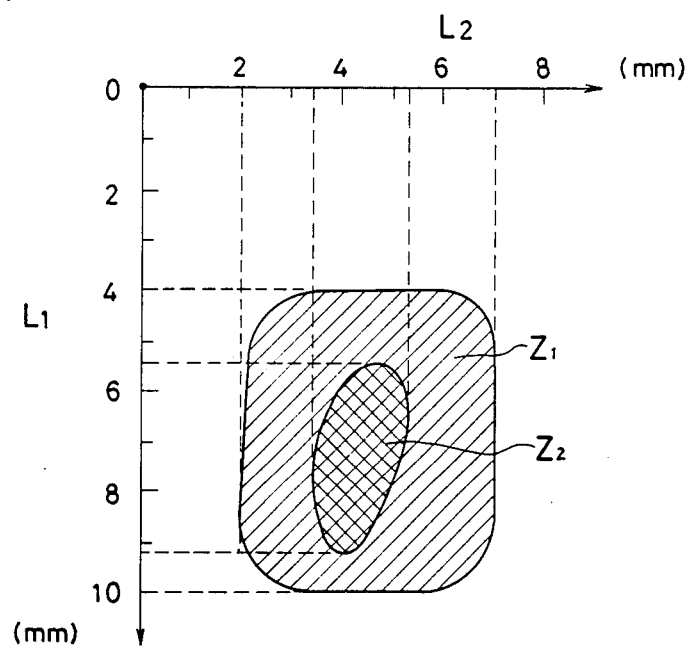
FIG. 9 is a graph showing the relation between the position of a spark gap of an ignition plug and the ignitability of the ignition plug.

FIG. 9 shows the relation between the position of the spark gap 9A of the ignition plug and the ignitability. It is understood that, if $L_1$ and $L_2$ are within the above-mentioned ranges, a stable ignition of the atomized fuel can be attained.

Referring to FIG. 9, therein the hatched portion $Z_1$ denotes a region in which the ignition of the fuel is possible, and the portion $Z_2$ marked with crossed diagonal lines, a region in which a stable ignition of the fuel can be attained.

Figure 12:
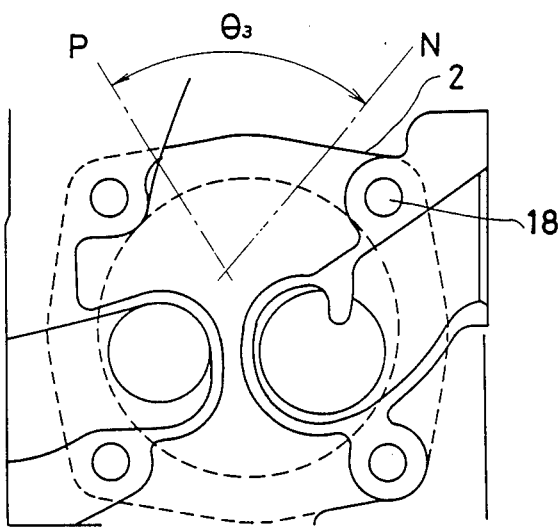
FIG. 12 is a cross-sectional view of the ignition chamber in a conventional single cylinder engine.
Figure 13:
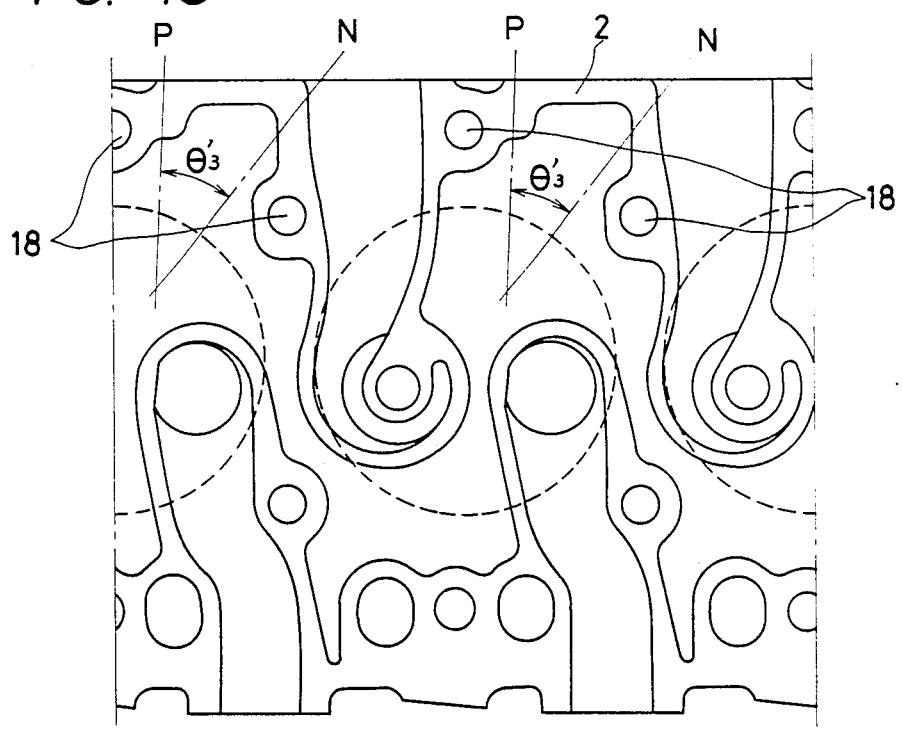
FIG. 13 is a cross-sectional view of the ignition chamber in a conventional multicylinder engine.

As shown in FIG. 12, in the case of single cylinder engines it is feasible to set to a relatively large value the angle $\theta_3$ between the axis N of the fuel injection valve and the axis P of the ignition plug in order to avoid interference in the vicinity of the ignition chamber. However, as shown in FIG. 13, in the case of multicylinder engines the angle $\theta'_3$ between the axes N and P has to be limited to a relatively small value on account of interference with the valve actuating system and that with the head bolts threadably engaged in the bolt holes 18. Now that in the vicinity of the ignition chamber a mutual interference is therefore unavoidable between the fuel injection valve and the ignition plug, problems are posed such that it in practice is impossible to realize an optimal structure and to dispose the axes N and P in a same plane perpendicular to the explosion surface.

Figure 10:
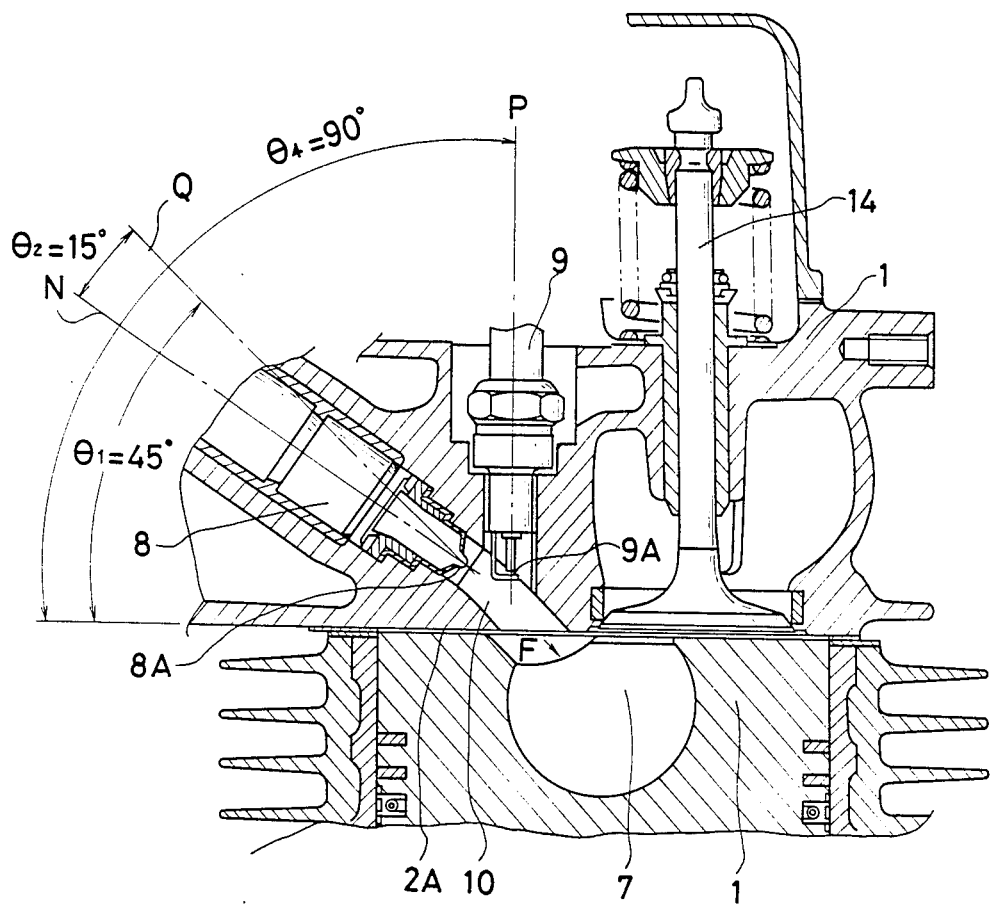
FIG. 10 is a longitudinal section of a fifth example of a principal portion, which is around a main combustion chamber, of an internal combustion engine according to the present invention.

FIG. 10 is a longitudinal section of a principal portion of an ignition chamber in a stratified charge combustion type internal combustion engine, in which shown is an ignition chamber 10 provided in a cylinder head 2 and having a fuel injection valve 8 and an ignition plug 9. This embodiment is a so-called overhead type engine provided with a valve gear system, such as suction and exhaust valves on the head of the engine.

In this embodiment, the ignition plug 9 is disposed vertically so that the angle $\theta_4$ between the axis P of the ignition plug 9 and the explosion surface or lower surface 2A of the cylinder head 2 is 90°. Also, the ignition chamber 10 is disposed diagonally so that the angle $\theta_1$ between the axis Q of the ignition chamber 10 and the explosion surface 2a is 45°, and the fuel injection valve 8 is inclined at an angle $\theta_2$ from the axis Q of the ignition chamber 10 toward the explosion surface 2A. In this embodiment, $\theta_2$ is set to 15°. If the parts are arranged in this manner, the ignition plug 9 and the fuel injection valve 8 do not interfere with each other even when the axis P of the former and the axis N of the latter are in the same perpendicular plane. Accordingly, tools for installing and removing these parts can be used.

If necessary, the axis P of the ignition plug 9 can also be set to 85° (=$\theta_4$) with respect to the explosion surface 2A, by inclining the axis N of the injection valve 8 by $\theta_2$=20°.

Figure 11:
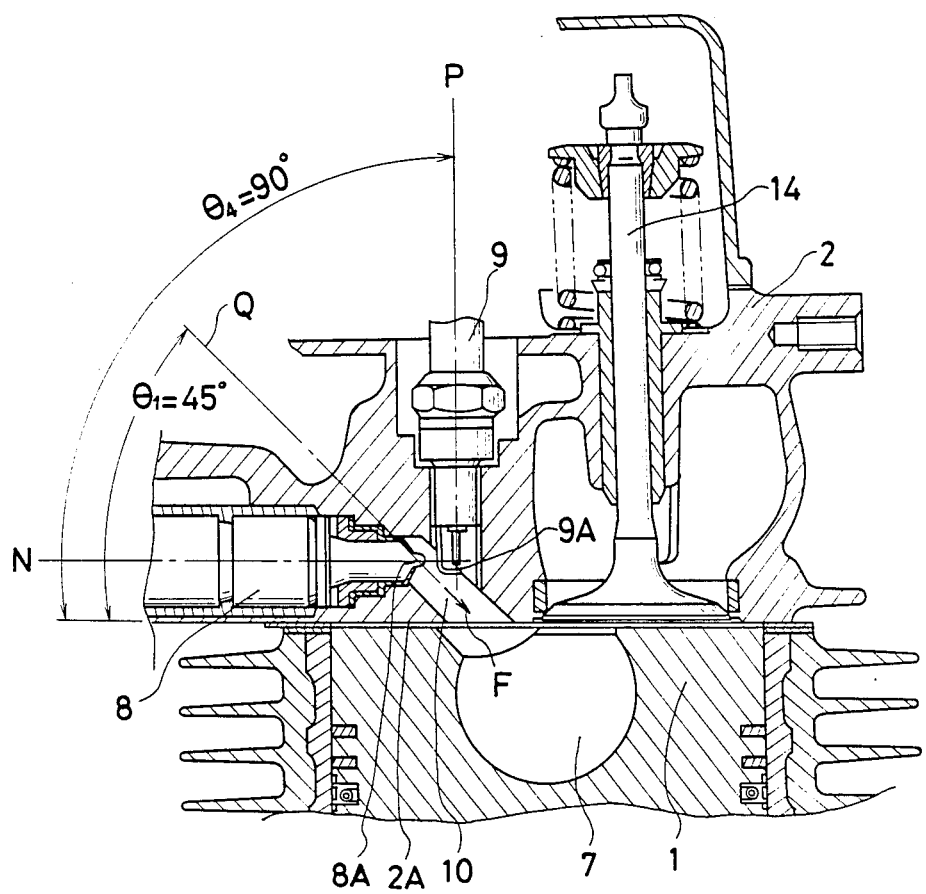
FIG. 11 is a longitudinal section of a sixth example of a principal portion, which is around a main combustion chamber, of an internal combustion engine according to the present invention.

In the case shown in FIG. 11, where the axis N of the fuel injection valve 8 is set substantially parallel to the explosion surface 2A, the angle $\theta_4$ between the ignition plug 9 and the explosion surface 2A can be set to 30° to 90°.

The present invention is not limited to the above-described embodiments, and it can be modified within the scope of the appended claims.

We claim:

1. An internal combustion engine having a main combustion chamber in a top portion of a piston, and an ignition chamber in a cylinder head, which is provided with a fuel injection valve and an ignition plug, characterized in that the direction in which fuel is ejected from said fuel injection valve is in accordance with the forward direction of a swirl in said main combustion chamber, the axis of the ejected fuel being spaced from a substantially central portion of said main combustion chamber by a distance of not more than ½ of the radius thereof, a recess which is in communication with said main combustion chamber being provided in the section of the top portion of said piston which is on an extension of said ignition chamber, the diameter of said ignition chamber is set larger than that of an atomized fuel spray at the outlet thereof, a spark gap of said ignition plug being provided in a position which is spaced by 4 to 10 mm from the center of the spherical end of a nozzle of said fuel injection valve toward the outlet of said ignition chamber, and 2 to 7 mm from the axis of said fuel injection valve in the radial direction of said ignition chamber.

2. An internal combustion engine according to claim 1, wherein the diameter of said recess provided in the top portion of said piston is set larger than that of said ignition chamber.

3. An internal combustion engine according to claim 1, wherein said ignition chamber is provided with helical grooves and ridges in and on the inner wall surface thereof.

4. An internal combustion engine according to claim 1, wherein the diameter of said ignition chamber is increased gradually toward an outlet thereof.

5. An internal combustion engine according to claim 1, wherein said ignition plug is provided so that it extends at 30° to 90° with respect to the explosion surface of a cylinder head into which said ignition chamber is opened, said fuel injection valve being provided so that it is inclined toward said explosion surface with respect to said ignition chamber, said fuel injection valve and said ignition plug being provided in a same plane perpendicular to said explosion surface.

* * * * *